Feb. 15, 1949.    L. WEBER    2,461,947
UNDERCUTTING TOOL
Filed Sept. 27, 1945
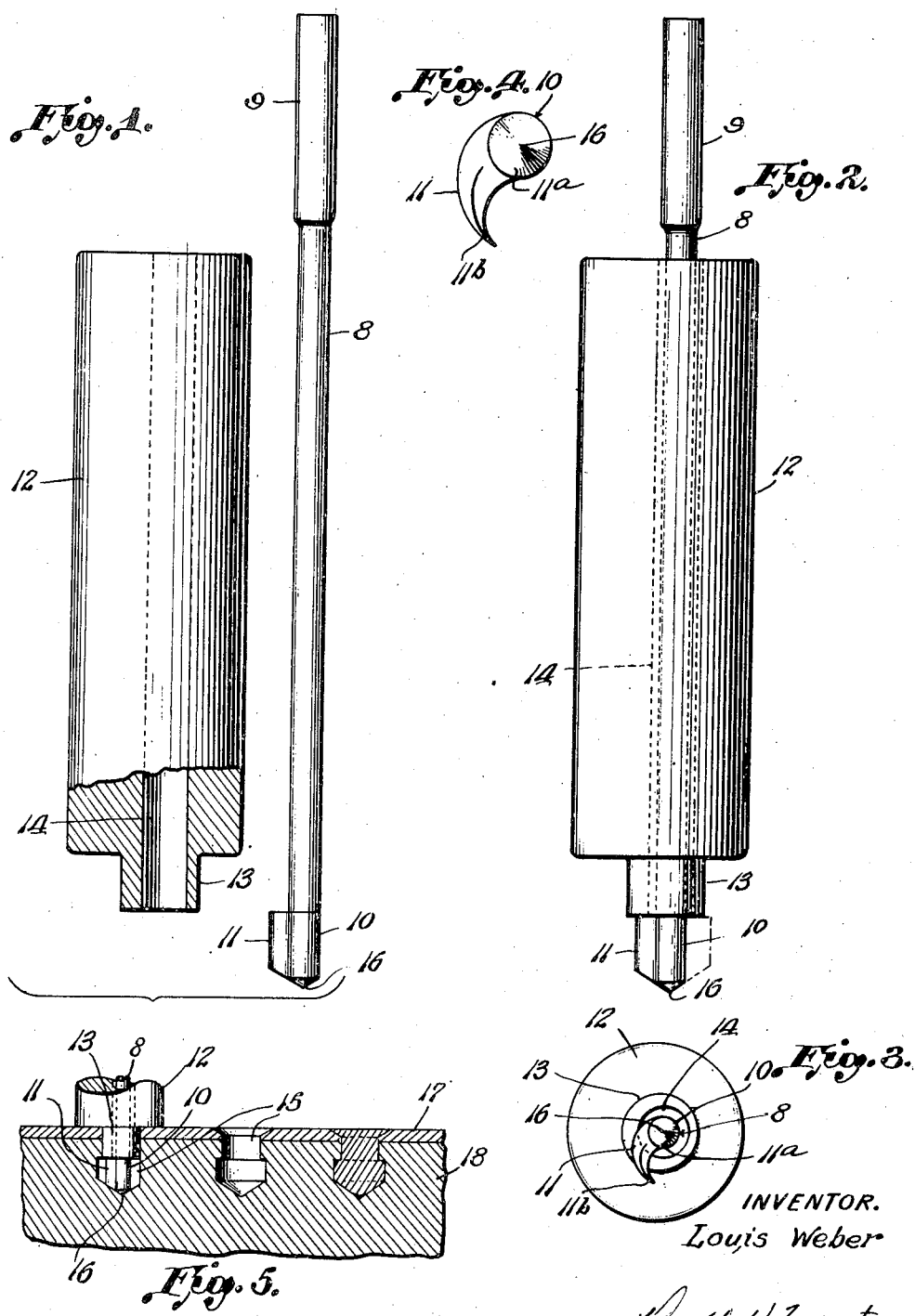
INVENTOR.
Louis Weber
Donald W. Farrington
ATTORNEY.

Patented Feb. 15, 1949

2,461,947

UNITED STATES PATENT OFFICE 2,461,947

UNDERCUTTING TOOL

Louis Weber, Jacksonville, Fla., assignor to The Glenn L. Martin Company, Middle River, Md., a corporation of Maryland Application September 27, 1945, Serial No. 618,954

5 Claims. (Cl. 77—58)

My invention relates to a metal working tool, and more particularly to a tool for undercutting blind rivet holes.

In the customary riveting operation, it is the practice to secure the rivet through a rivet hole formed in the pieces to be joined by bucking the stem of the rivet with a bucking bar so that the rivet stem is upset and thereby prevented from being withdrawn through the rivet hole. There are, however, many instances in which a riveting operation would be desirable but where it is undesirable to drill the rivet hole completely through both pieces to be joined because too long a rivet would be required. For example, in the construction of aircraft, or the like, there are many instances in which the skin, or thin sheet of surface metal, must be secured to a thick inner frame work of the plane, such as a spar or the like. In such instances, the thickness of the frame work is such as to make impractical the cutting of a rivet hole through both the skin and the frame work.

One manner in which the two pieces may be riveted together is by drilling a rivet hole through the skin and for a predetermined distance into the frame work and then enlarging the inner end of the rivet hole. When a rivet is placed into the hole the riveting operation will drive the stem of the rivet against the bottom of the rivet hole, and the pressure will deform the rivet stem causing it to flow into the enlarged recess about the rivet hole. This process is known as blind riveting.

There is at present no satisfactory, efficient portable tool for undercutting blind rivet holes. The prior art proposals involve laborous operations by highly skilled workers. As the result the current method of fastening a sheet of metal to a thick frame work or the like, where rivet bucking is impossible, is by use of tapped screw holes and screws.

It is a purpose of my invention to provide a tool for the counterboring of blind rivet holes whereby the operation may be quickly and accurately performed, and whereby an ordinary riveting operation may be used in place of the more expensive tapping and threading processes.

It is among the objects of my invention to provide a tool for undercutting blind rivet holes wherein a tool body, having a guide to fit the rivet hole, has mounted therein a rotary cutting tool eccentric of the axis of the rivet hole so that the cutting edge of the cutting tool during its rotation describes a path, a portion of which extends beyond the outline of the guide to form a recess having a diameter exceeding the diameter of the rivet hole.

It is an object of my invention to provide a tool that can be inserted in a drilled hole which consists of a guide and rotating cutter, the guide extending into the hole, the cutter being mounted eccentrically in the guide so that the cutting blade can be withdrawn to a position within the confines of the portion extending into the hole to permit the insertion and removal of the cutter. When the cutter is rotated it undercuts the hole in one area around the guide, and as the guide is rotated, it extends the undercut area until it completely surrounds the hole so that an annular undercut area at a predetermined depth in the hole is formed.

It is a further object of my invention to undercut rivet holes by inserting the concentric collar of a shaft guide in the rivet hole to be undercut, said collar and shaft guide being provided with an eccentric bore adapted to accommodate a rotary shaft, said shaft having a cutting head mounted at one end thereof adapted to rotate with said shaft adjacent said collar, a portion of said cutting head being adapted to extend beyond the periphery of said collar during a portion of its cycle, and by rotating said shaft in said guide while the guide is revolved through an angle of 360°.

All these and other objects will be apparent from the following description and from the drawings wherein:

Figure 1 is an exploded view of my blind rivet hole undercutter.

Figure 2 is a view showing my tool assembled.

Figure 3 is an end view of the assembled tool shown in Figure 2.

Figure 4 is an enlarged detail of the cutter.

Figure 5 is a cross sectional view of two pieces of metal which shows the method of using my blind rivet hole undercutting tool.

A shaft generally indicated as 8 has an enlarged end portion 9 adapted to be gripped by the chuck of a power driven drill and a lower portion 10 of reduced diameter terminating in a cutting head or bit 11. A shaft holder or guide 12 is provided at one end with a concentric collar 13 of a size adapted to be inserted in the rivet hole to be worked, whereby the guide 12 and shaft 8 are positioned in the rivet hole to be undercut. The depth to which this collar 13 extends into the rivet hole controls the position of the undercut, as will presently be shown. The guide 12 is formed with an off center bore 14 which extends completely through the guide and the stop collar, and which is large enough in diameter to accommodate passage of the end portion 9 of the shaft 8. It follows that the bore is substantially larger than the reduced portion 10 of the shaft 8, so that a certain amount of play is permissible in the shaft as it rotates in the guide 12. The cutter or bit 11 is shown in detail in Figure 4, and comprises a circular base portion 11a concentric with the shaft 8 and a curved cutter bit 11b adapted to rotate with the base 11a. Since the guide hole 14 is eccentric of the guide 12 and stop collar 13, and since shaft portion 10 is smaller than the guide 14 the cutter bit 11b can be positioned within the confines of collar 13 so that the bit and collar assembly can be inserted through the hole. The bit 11b of the cutter, when rotated, extends beyond the periphery of the stop collar as shown in phantom in Figure 2. This is an important feature of my tool since it permits the insertion of the cutter or bit 11 into the rivet hole to be worked ahead of the stop collar 13 which is of the same size as the rivet hole. Yet after the cutter has been inserted into the hole it will be effective to undercut the walls of the hole to the desired depth.

I will be noted that the end of the cutter 11 is tapered to a point 16 which taper conforms with the bottom of the drilled hole. Point 16 nests in the bottom of the drilled hole and is thus afforded a bearing during the cutting operation and assures concentricity of the hole and the final annular undercut. Since the guide hole 14 is larger than the reduced portion 10 of the shaft there is adequate space to permit the flexing or bending of the shaft which is inevitable during the early stages of the cutting operation. As the bit bites deeper into the rivet hole wall this flexing or bending of the shaft will be lessened until, at the full depth of the undercut, the shaft is vertical. The large diameter of the bore also permits the passage of the end portion 9 of the shaft 8 through the guide hole 14 in order to assemble the tool.

The operation of my device is as follows: Rivet hole 15 is first drilled to the required diameter and depth through members 17 and 18 to be riveted, member 17 represents the skin and member 18 a structure such as a spar. The stop collar 13 of the blind rivet hole undercutter is then inserted into the rivet hole until the base of the guide 12 rests firmly on the top surface of the metal to be worked (see Fig. 5). The presence of the stop collar in the rivet hole to a predetermined depth assures that the undercutting of the hole will not be above the bottom of the collar. The shaft 8 is then rotated by a motor and the cutter 11 proceeds to undercut the wall of the rivet hole. As the shaft 8 is being rotated, the operator manually turns the guide 12 through 360° so that the cutter bit 11b will engage the entire surrounding surface and will cut it to a uniform diameter. When the cutting operation is completed the cutter bit 11b is turned until it is within the cross sectional area defined by the stop collar 13 so that the tool may be withdrawn from hole 15. The arrangement results in a reentrant opening proportioned with respect to the rivet to effect the full upset head within the opening and sufficient metal above the opening to develop full strength of the rivet.

After the cutting operation is complete a rivet of the desired size is placed in the rivet hole. The riveting operation upsets the inner end of the rivet against the bottom of the hole, causing it to expand into the undercut portion of the rivet hole 15. Thus, when the riveting operation is complete a secure bond is formed between the two pieces of metal, the rivet being securely held in the rivet hole 15.

Inspection of cutaway samples of parts joined according to my invention shows that the riveting operation effecting the upsetting of the rivet within the bore accomplishes some deformation of the walls of opening around the upset eliminating sharp corners. It will be appreciated that such deformation of the stock around the upset improves the grain structure of the stock and that the complementary filet formed between the upset and shank of the rivet insures development of full rivet strength in shear.

It will be understood that many modifications of my invention may be made within the spirit and scope of my discovery and that my invention is not to be limited save within the scope of the following claims.

I claim:

1. Means for undercutting a hole having a side wall area and an inverted cone-shaped bottom area comprising a flexible rotary shaft adapted for drive rotation with one end coupled to a rotatable driving device and the other end provided with a cutter having a cutting edge and a coaxial tapered point shaped to effect a nested position with the inverted cone-shaped bottom of the drill hole on completion of the undercutting cycle of operation, a guide means for said rotary shaft comprising a cylindrical body and a concentric collar depending from said body, said body and collar being formed with an eccentric bore adapted to accommodate said shaft, said bore being of a diameter sufficient to permit the flexing of the shaft to effect angled engagement of the cutting edge with the sidewall area during movement of the tapered point of the cutter into nested engagement with the bottom of the drill hole, the length of said cutter being substantially equal to the outer diameter of said collar whereby a portion of the cutter extends beyond the periphery of said collar during a portion of its cycle and during the balance of its cycle lies entirely within the cross sectional area defined by said collar.

2. A tool for the undercutting of blind rivet holes comprising, in combination, a shaft having an end portion adapted for rotatable engagement with the chuck of a power driven drill and a middle portion of reduced diameter terminating in a double bearing cutting head having a curved cutter and a tapered coaxial bearing point shaped to conform with the bottom of a drill hole, a shaft guide and a depending stop collar having an eccentric vertical bore of a diameter substantially larger than the maximum diameter of said shaft to provide for substantial side play between the shaft and the guide with the shaft inserted therethrough, said stop collar being adapted for insertion into a rivet hole to a predetermined depth with the cutting head extended therefrom, the curved cutter having a length substantially equal to the maximum annular clearance of the stop collar from the side of the rivet hole whereby gradual radial displacement of the cutting head effects angular engagement of the cutter with the sides of the rivet hole during simultaneous engagement of the tapered coaxial point of said cutting head with the sloped bottom of the rivet hole, the angle of engagement between the cutter and side wall being determined by the play provided between the shaft and guide.

3. A tool for the undercutting of a blind rivet hole having a side wall area and a bottom area formed with a depressed center comprising, in combination, a shaft adapted to be rotatably driven, a shaft guide, a stop collar depending centrally from the end of said guide, said guide and collar being provided with an eccentric bore of a diameter sufficient to accommodate said shaft, and a cutting head having a cutting edge rotatably carried by said shaft adjacent said collar having a bearing point coxial with said shaft adapted for engagement with the depressed center of said bottom area to effect progressive centering of said shaft in the hole with the cutting edge in engagement with the side wall area of the hole.

4. Means for undercutting a hole having a side wall area and an inverted cone-like bottom area comprising, in combination, a rotary shaft adapted for drive rotation with one end coupled to a rotary drive means and the other end provided with a cutter having a coaxial dependent bearing surface adapted to effect progressive centered engagement with said bottom area during the undercutting cycle of operation of said cutter, a guide means for said rotary shaft comprising a cylindrical body having an end portion adapted for insertion in the rivet hole, said body being formed with an eccentric bore of sufficient diameter for rotation and side movement of said shaft inserted therethrough to effect progressive engagement of the cutter with the side wall area on radial displacement of the body during the undercutting cycle with the bearing surface of the cutter in engagement with the bottom area of the hole, the cutting path of the cutter being substantially equal to the outer diameter of the end portion of the cylindrical body whereby a portion of the cutter extends beyond the periphery of said end portion during a portion of its cycle and during the balance of its cycle lies entirely within the cross sectional area defined by said end portion.

5. A tool for the undercutting of a blind rivet hole comprising, in combination, a shaft adapted for rotative drive, a cutting head adapted for rotation by said shaft having a cutting edge and a coaxial bearing point shaped to conform with the bottom of a drill hole, a shaft guide having one end suited for centered insertion in said drill hole and formed with an eccentric bore of a diameter substantially larger than the maximum diameter of said shaft to provide for substantial side play between the shaft and the guide with the shaft inserted therethrough, said end of the guide adapted for insertion in the rivet hole being provided with stop means to limit insertion of said end into said rivet hole to a predetermined depth with the cutting head extended therefrom, said cutting edge of the cutting head being of a length substantially equal to the maximum annular clearance of the guide end from the side of the rivet hole whereby gradual radial displacement of the cutting head effects angular engagement of the cutting edge with the side area of the rivet hole during simultaneous engagement of the coaxial bearing point of said cutting head with the bottom of the rivet hole.

LOUIS WEBER.

REFERENCES CITED

The following references are of record in the file of this patent:

UNITED STATES PATENTS

| Number | Name | Date |
| --- | --- | --- |
| 2,166,923 | Woodcock | July 18, 1939 |